United States Patent [19]

Kishi et al.

[11] Patent Number: 5,132,180

[45] Date of Patent: Jul. 21, 1992

[54] COMPOSITE PAINT FILM COATING

[75] Inventors: Hiroyuki Kishi, Yokohama; Hitoshi Kimura, Chigasaki; Katsuya Yamamoto, Yokohama; Yoshinobu Tamura, Sagamihara; Tsuneo Sakauchi; Masahide Nagaoka, both of Yokohama; Masaya Kawabata, Yao; Akitoshi Shirasaka, Kawanishi; Shinichi Inoue, Osaka; Makoto Efumi, Narashino; Shosaku Yamamoto, Yokohama; Michiaki Wake, Chigasaki; Masayuki Takemoto; Naoya Sakai, both of Yokohama, all of Japan

[73] Assignees: Nissan Motor Co., Ltd.; Shinto Paint Co., Ltd; Nippon Oil & Fats Co., Ltd., all of Tokyo, Japan

[21] Appl. No.: 521,966

[22] Filed: May 11, 1990

[30] Foreign Application Priority Data

May 18, 1989 [JP] Japan .................................. 1-122820

[51] Int. Cl.⁵ ................................................. B32B 15/08
[52] U.S. Cl. ..................................... 428/457; 428/458; 428/480
[58] Field of Search ............... 428/457, 458, 480, 483, 428/482

[56] References Cited

FOREIGN PATENT DOCUMENTS

| 53-8673 | 1/1978 | Japan . |
|---|---|---|
| 53-16048 | 2/1978 | Japan . |
| 53-47143 | 12/1978 | Japan . |
| 53-142444 | 12/1978 | Japan . |
| 54-15449 | 2/1979 | Japan . |
| 54-4978 | 3/1979 | Japan . |
| 54-93024 | 7/1979 | Japan . |
| 55-80436 | 6/1980 | Japan . |
| 55-115476 | 9/1980 | Japan . |
| 59-129270 | 7/1984 | Japan . |
| 59-206442 | 11/1984 | Japan . |
| 60-90273 | 5/1985 | Japan . |
| 63-39972 | 2/1988 | Japan . |
| 63-62897 | 3/1988 | Japan . |
| 63-63761 | 3/1988 | Japan . |

OTHER PUBLICATIONS

No. 95 The Industrial Coating "Volastatic Cartridge Booth".

Primary Examiner—Thomas J. Herbert, Jr.
Attorney, Agent, or Firm—Pennie & Edmonds

[57] ABSTRACT

A composite paint film coating formed on a steel sheet of an automotive vehicle body. The composite paint film coating is comprised of an electrodeposition paint film (I) coated on the steel sheet, and an intermediate paint film (II) coated on the first paint film. The electrodeposition paint film has a minimum melt viscosity not less than 0.2 during hardening. The electrodepositon paint film is formed of cathodic electrodeposition paint composition which includes a cationic thermosetting resin (1), and an already cross-linked particulate resin (2). The particlate resin is an addition-polymer formed between a fist compound (A) having at least two primary amino groups in a molecule, and a second compound (B) having at least two $\alpha,\beta$-ethylenic unsaturated groups. The particulate resin has an average particle size ranging from 0.01 to 1 $\mu$m. The weight ratio ((2)/(1)) in solid content between the particulate resin (2) cationic thermosetting resin (1) is within a range from 0.03 to 0.15. The intermediate paint film (II) has hardening starting time ranging from 5 to 20 minutes.

10 Claims, 1 Drawing Sheet

COMPOSITE PAINT FILM COATING

BACKGROUND OF THE INVENTION

1. Field of the Invention

This invention relates to improvements in a composite paint film coating coated on a steel plate for the purpose of improving rust resistance of the steel plate and a gloss and brightness character of the coated paint film coating, and more particularly to such an improved composite paint film coating to be coated on the outer panel of an automotive vehicle.

2. Description of the Prior Art

In general, a composite paint film coating for an automotive vehicle outer panel is constituted of an electrodeposition paint film for the purpose of rust prevention, an intermediate coat paint film for the purpose of thickening the composite film coating, and a finish coat paint film for the purpose of coloring. The automotive vehicle outer panel coated with such a composite paint film coating is required to have higher smoothness, gloss and the like. Total evaluation of such characteristics has been usually accomplished with a so-called PGD value which is measured by a PGD (Portable Gloss and Distinction) meter. This PGD meter is, for example, a PGD-3 type one produced by the Japan Colour Research Institute in Japan. It is known to one skilled in the art, that the PGD value becomes higher as the smoothness and gloss of the finish coating film is higher. Here, the gloss (or a gloss and brightness character) of the composite paint film coating depends on the performance of the finish coat paint film and seems to be an independent function of a finish coat paint. Concerning the smoothness, it is largely affected by the smoothness of under-coat films and therefore the electrodeposition paint film is eagerly required to have a high smoothness.

In conventional electrodeposition films, a measure to raise fluidity (i.e., to lower its melt viscosity) during baking has been taken in order to improve the smoothness of the electrodeposition film. There is an Oscillated Pendulum Analysis (OPA). with an oscillated pendulum type viscoelasticity measuring device, as a method of measuring the fluidity of an electrodeposition film during baking. The degree of the fluidity can be represented with a minimum melt viscosity ($\lambda$ min) determined by the measuring method.

Conventional electrodeposition paints have a minimum melt viscosity ($\lambda$ min) of 0.15 or lower according to the above measuring method. In connection with such electrodeposition paints, intermediate coat paints are designed to harden for as shorter a time as possible in order to ensure the smoothness of the coated paint film on a horizontal plane and to prevent deterioration of the smoothness of the same film on a vertical plane on which smoothness deterioration is caused by run of the coated paint film during baking. Additionally conventional intermediate coat paints have a hardening starting time, measured by the Oscillated Pendulum Analysis (OPA), from 2 to 15 minutes. Thus, the conventional composite paint film coatings are expressed to be formed by coating the intermediate coat paint film having a hardening starting time shorter than 15 minutes (according to OPA) on the electrodeposition paint film having a minimum melt viscosity ($\lambda$ min) of 0.15 or lower (according to OPA).

In such conventional paint film coatings, measures to increase the flowability of the coated electrodeposition paint film as discussed above have been taken. However, under the action of surface tension of the molten coated film at an edge portion of the steel plate of the automotive vehicle outer panel, the edge of the steel plate is exposed without the coat film, so that the above-discussed conventional composite paint film coating is inferior in so-called edge corrosion resistance.

If the edge corrosion resistance is intended to be improved in the conventional composite paint film coatings, it may be proposed to increase the viscosity of the electrodeposition paint film while in a molten condition. For this purpose, measures have been proposed to increase the concentration of pigment in the electrodeposition paint (i.e., P(pigment)/B(binder) ratio), a measure to add non-molten type cross-linking resin particles (i.e., a reology control agent) to the electrodeposition paint, and a measure to lower the hardening temperature to suppress flowing of the electrodeposition paint in a molten state under a cross-linking reaction. These measures are disclosed, for example, in Japanese Patent Provisional Publication Nos. 63-62897. 63-39972 and 63-63761 and a Japanese literature "Industrial Painting (No. 95, Pages 33 to 35)". However, any of these measures largely degrades the flowability of the electrodeposition paint in a molten state. Assuming that these measures are taken to obtain a good edge corrosion resistance, the smoothness of the coated surface of the electrodeposition paint is unavoidably deteriorated. Accordingly, in a case in which conventional intermediate and finish coats are formed on the thus formed electrodeposition paint film, the PGD value of the finish coat paint film on a horizontal plane largely lowers, thereby degrading the commercial value of the resultant automotive vehicle.

In view of the above, it has been eagerly desired in an automotive industry to obtain a composite paint film coating exhibiting both high edge corrosion resistance and good external appearance.

SUMMARY OF THE INVENTION

As a result of a variety of researches and developments for composite paint film coatings exhibiting high edge corrosion resistance and high external appearance, the inventors have experimentally found that the PGD value on a horizontal plane is lowered while no change of the same value is made on a vertical plane, in a painting system which is constituted by coating conventional intermediate and finish coat paints on the surface of an electrodeposition paint film whose flowability is lowered (See Comparative Examples 1 and 2). Taking account of this, the relationship between the degrees of deterioration of smoothness (due to run) on the vertical plane and the hardening starting time measured by the OPA has been studied. As a result, it has been confirmed that in a case of the intermediate coat paint having a hardening starting time not more than 20 minutes, the PGD value on the vertical plane after coating of the finish coat paint is the same as in a case the conventional intermediate coat paint is used (See Comparative Examples 1 to 10).

Besides, it has been confirmed that the same result is obtained for the vertical plane even in a case of using a low flowability electrodeposition paint. However, the PGD value on the horizontal plane is different according to the electrodeposition paints and intermediate coat paints used (See Comparative Examples 1 to 15).

Extensive research and development by the inventors taking account of the above-discussed experimental results have revealed that improvements in both high edge corrosion resistance and high external appearance can be realized by a composite paint film coating of the present invention.

A composite paint film coating of the present invention comprises a first paint film (I) and second paint film (II) coated on the first paint film. The first paint film (I) is formed of cationic electrodeposition paint composition and has a minimum melt viscosity not less than 0.2 during hardening. The minimum melt viscocity is determined according to a logarithmic decrement of viscoelasticity of the first paint film and by an oscillated pendulum type viscoelasticity measuring device. The cathodic electrodepostion paint composition includes a cationic thermosetting resin (1) and an already cross-linked particulate resin (2). The particulate resin is an addition-polymer formed between a first compound (A) having at least two primary amino groups in a molecule and a second compound (B) having at least two $\alpha,\beta$-ethylenic unsaturated groups. The addition-polymer has a cationic group. The particulate resin has an average particle size ranging from 0.01 to 1 $\mu$m. The weight ratio ((2)/(1)) in solid content between the particulate resin (2) and the cationic thermosetting resin (1) is within a range from 0.03 to 0.15. The second paint film (II) has a hardening starting time ranging from 15 to 20 minutes. The hardening starting time is determined according to a logarithmic decrement of viscoelasticity of the second film and by the oscillated pendulum type viscoelasticity measuring device.

The thus configured composite paint film coating of the present invention can offer significant advantages of greatly improving both the edge corrosion resistance of a steel plate and the extend appearance (or the gloss and brightness character) of the coated paint film after application of the finish coat paint.

DETAILED DESCRIPTION OF THE INVENTION

According to the present invention, a composite paint film coating comprises a first paint film (I) and a second paint film (II) coated on the first paint film. In this embodiment, the first paint film (I) is coated on the surface of a steel plate or sheet forming part of an automotive vehicle body outer panel.

The first paint film (I) is formed of cationic electrodeposition paint composition and has a minimum melt viscosity not less than 0.2 during hardening. The minimum melt viscosity is determined according to a logarithmic decrement of viscoelasticity of the first paint film and by an oscilated pendulum type viscoelasticity measuring device. The cathodic electrodeposition paint composition includes a cationic thermosetting resin (1) and an already cross-linked particulate resin (2). The particulate resin is an addition-polymer formed by a reaction between a first compound (A) having at least two primary amino groups in a molecule and a second compound (B) having at least two $\alpha,\beta$-ethylenic unsaturated groups per molecule. The addition-polymer has cationic groups. The particulate resin has an average particle size ranging from 0.01 to 1 $\mu$m. The weight ratio ((2)/(1)) in solid content between the particulate resin (2) and the cationic thermosetting resin (1); delete "and the particulate resin". and the particulate resin is within a range from 0.03 to 0.15.

The second paint film (II) has a hardening starting time ranging from 15 to 20 minutes. The hardening starting time is determined according to a logarithmic decrement of viscoelasticity of the second film and by said oscillated pendulum type viscoelasticity measuring device.

In order to improve the edge corrosion resistance of the steel plate of the automotive vehicle outer panel, the minimum melt viscosity of the first or electrodeposition paint film (I) is required to be not less than 0.2. This is because the edge corrosion resistance is inferior if the minimum melt viscosity is less than 0.2. Additionally, in order to achieve a minimum melt viscosity not less than 0.2, the electrodeposition paint composition is required to include the cationic thermosetting resin (1) and the already cross-linked particulate resin (2), in which the weight ratio ((2)/(1)) in solid content between particulate resin (2) and the cationic thermosetting resin (1) is within a range from 0.03 to 0.15. This weight ratio range is determined for the following reasons: If the weight ratio is less than 0.03, the edge corrosion resistance of the vehicle body outer panel is insufficient while the external appearance of the vehicle body outer panel is generally equal to that in conventional composite paint film coatings, so that no balance is established between the edge corrosion resistance and the external appearance. If the weight ratio is larger than 0.15, the edge corrosion resistance is impoved while the smoothness of the coated composite paint film coating is extremely inferior, so that both the edge corrosion resistance and the external appearance cannot be satisfied.

The above-mentioned cationic thermosetting resin (1) of the electrodeposition paint film (I) is neutralized with acid and thereafter is diluted with water thereby to provide a cationic water dispersion liquid (the resin dispersed in water) or an aqueous solution (the resin dissolved in water). Such a dispersion liquid or an aqueous solution is coated on the automotive vehicle body outer panel steel plate under electrodeposition painting to provide a wet paint film. When the wet paint film is heated at a temperature over 100° C., the resin composition in the dispersion liquid or the aqueous solution undergoes a hardening reaction in which the functional groups contributing to hardening of the cationic thermosetting resin react.

The cationic thermosetting resin (1) contains cationic groups which are introduced thereinto under the action of basic nitrogen. Introduction of the cationic groups is carried out, for example, by reacting primary or secondary amine with an epoxy group-containing resin.

The above-mentioned functional groups contributing to hardening of the cationic thermosetting resin is chemically bonded with a base component of the cationic thermosetting resin. Otherwise, the functional groups may be independent from the base component to serve as a hardener. Examples of the functional groups are unsaturated double bond tending to contribute to oxidation polymerization, vinyl double bond tending to contribute to radical polymerization, a combination of active hydrogen and a blocked isocyanate, a combination of hydroxyl group and a melamine resin, and a combination of hydroxyl group and a polyester having an ester interchanging ability.

Examples of the cationic thermosetting resin (1) are amino group-containing resins such as amine-modified epoxy resins as disclosed in Japanese Patent Publication Nos. 54-4978 and 53-47143, and Japanese Patent Provisional Publication Nos. 54-93024, 53-8673, 55-80436 and 59-206442, amine-modified polyurethane polyol resins as disclosed in Japanese Patent Provisional Publication Nos. 54-15449 and 55-115476, and amine-modified polybutadiene resins as disclosed in Japanese Patent Provisional Publication Nos. 53-16048, 53-142444 and 60-90273; resins containing sulfonium group; and resins containing phosphonium group.

The above-mentioned already cross-linked particulate resin (2) in the electrodeposition paint film (I) is obtained by an addition-polymerization carried out between the first compound (A) having at least two primary amino groups per molecule and the second compound (B) having at least two $\alpha,\beta$-ethylenic unsaturated groups.

The first compound (A) as a raw material of the already cross-linked particulate resin (2) is obtained by carrying out an addition reaction of a ketimine compound to an epoxy resin to form an addition reaction product and thereafter by carrying out a hydrolysis of the addition reaction product thereby to regenerate primary amino group. The ketimine compound is obtained by a dehydration condensation reaction between a ketone compound and an amine compound having at least one secondary amine and at least one amino group per molecule. Examples of the first compound (A) are disclosed in Japanese Patent Provisional Publication Nos. 54-93024 and 59-129270. Preferably, the first compound has at least one primary amino group per molecule, in which water dispersion stability of the first compound is inferior if the primary amino group is less than one per molecule so that cationic groups are insufficient.

Examples of the above-mentioned amine compound as a starting material of the first compound (A) are monoalkyl aminoalkyl amines such as monomethyl aminoethyl amine, monoethyl aminoethyl amine, monomethyl aminopropyl amine and monoethyl aminopropyl amine; and polyalkylene polyamines such as diethylene triamine, dibutylene triamine and triethylene tetramine.

Examples of the ketone compound as a starting material of the first compound (A) are acetone, methylethyl ketone, methylisobutyl ketone, methylpropyl ketone and cyclohexanone.

The second compound (B) as a raw material of the already cross-linked particulate resin (2) is obtained by reacting a carboxylic acid having at least two $\alpha,\beta$-ethylenic unsaturated groups per molecule with an epoxidated polytutadiene which contains at least two epoxy groups per molecule. Otherwise, the second compound (B) may be obtained by reacting the $\alpha,\beta$-ethylenic unsaturated carboxylic acid with the epoxidated polybutadiene after reacting a secondary amine as disclosed in Japanese Patent Provisional Publication No. 63-39972. Furthermore, the second compound (B) may be obtained by reacting a reaction product formed between a diisocyanate compound and a $\alpha,\beta$-ethylenic unsaturated compound containing hydroxyl group in a mol ratio of 1:1, with a secondary amine-added epoxidated polybutadiene.

The second compound (B) is required to have at least two $\alpha,\beta$-ethylenic unsaturated groups per molecule for the following reason: If the $\alpha,\beta$-ethylenic unsaturated groups in a molecule is less than two, a fine cross-linking structure or network cannot be formed in the coated electrodeposition paint film, thereby providing a degrated edge corrosion resistance.

The above-mentioned epoxidated polybutadiene as a raw material of the compound (B) has a molecular weight ranging from 500 to 10000, unsaturated double bonds contributing to an iodine value ranging from 50 to 500, and 3 to 12% by weight of oxirane oxygen.

The above-mentioned $\alpha,\beta$-ethylenic unsaturated group may be introduced into a compound such as the epoxidated polybutadiene, for example, by using (meth) acrylic acid, hydroxyethyl (meth) acrylate.

Examples of the above-mentioned secondary amine for preparation of the compound (B) are aliphatic amines such as dimethyl amine and diethyl amine, and alkanol amines such as methylethanol amine and diethanol amine.

The already cross-linked particulate resin (2) is prepared by addition-polymerization between the first compound (A) and the second compound (B). The addition-polymerization is carried out as follows: The first and second compounds (A), (B) are mixed with each other to obtain a mixture. A solvent such as alcohol, ester and/or ketone and an organic acid such as formic acid, acetic acid and/or lactic acid are added to the mixture. Thereafter the mixture is heated at about 40° to 100° C. under vigorous stirring thereby to accomplish a partial addition (polymerization) reaction. Further, water or an aqueous dilution liquid of the cationic thermosetting resin is added to the mixture. Then the mixture is heated at about 40 to about 80° C. thereby causing the addition (polymerization) reaction to progress so that cross-linking is accomplished in a particulate resin. In this case, it will be understood that it is preferable to suitably select the type and the amount of solvent, the concentration of a neutralizing agent, the degree of stirring, the temperature and the time of reaction, the supply rate of water or the aqueous dilution liquid in order to control the degree (gelation degree) of the cross-linking in the particulate resin and the average particle size of the particulate resin.

The average particle size of the already cross-linked particulate resin (2) is required to be within a range from 0.01 $\mu$ to 1 $\mu$ for the following reasons: If it exceeds 1 $\mu$, a stable water dispersion liquid of the particulate resin (2) is difficult to obtain. If it is smaller than 0.01 $\mu$, the flowability suppresion effect for the paint film at the edge section of the steel plate becomes lower during baking of the coated paint film, so that so-called edge covering ability becomes insufficient.

An intermediate or second coat paint film (II) is coated on the first or electrodeposition paint film (I) of the electrodeposition paint composition. The intermediate coat film is formed by coating an intermediate coat paint composition having the hardening starting time ranging from 15 to 20 minutes, determined according to the logarithmic decrement of viscoelasticity measured by the oscillated pendulum type viscoelastity measured by the oscillated pendulum type viscoelastity measuring device. The range of the hardning starting time has been determined for the reasons set forth below. If the time is less than 15 minutes, it is difficult to smooth the unevenness of the surface of the electrodeposition paint film. If the time exceeds 20 minutes, smoothing the surface of the electrodeposition paint film is sufficiently achieved on a horizontal plane, however, run of the intermediate coat paint occurs on a vertical plane, thereby degrading the external appearance of the coated paint film coating.

The method of determining the minimum melt viscosity ($\lambda$ min) of the electrodeposition paint and the hardening starting time (t) of the intermediate coat paint particulate resin (2) and discussed below.

Minimum Melt Viscosity ($\lambda$ min)

Figure 1:
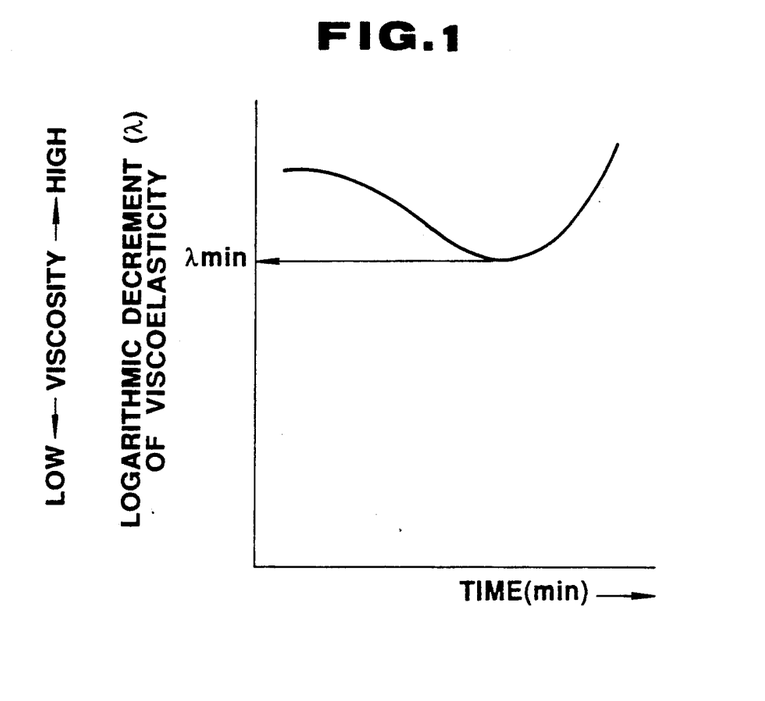
FIG. 1 is a graph showing the relationship between time and logarithmic decrement, for the purpose of determining the minimum melt viscosity ($\lambda$ min) of the first or electrodeposition paint film of the composite paint film coating according to the present invention.

The viscoelasticity of the electrodeposition paint was measured according to Oscillated Pendulum Analysis (OPA) or by an oscillated pendulum type viscoelasticity measuring device (the trade name "Rheo-Vibron DDV-OPA") produced by Orientic Corporation in Japan, under conditions of weight: 22 g, moment of inertia: 859 g.cm$^2$, and temperature rising rate: 20° C./min. In the course of this viscoelasticity measurement, the lowest logarithmic decrement ($\lambda$ min) was measured to obtain the minimum melt viscosity ($\lambda$ min). FIG. 1 illustrates a method for determining the minimum melt viscosity ($\lambda$ min) for the electrodeposition paint.

Hardening Starting Time (t)

Figure 2:
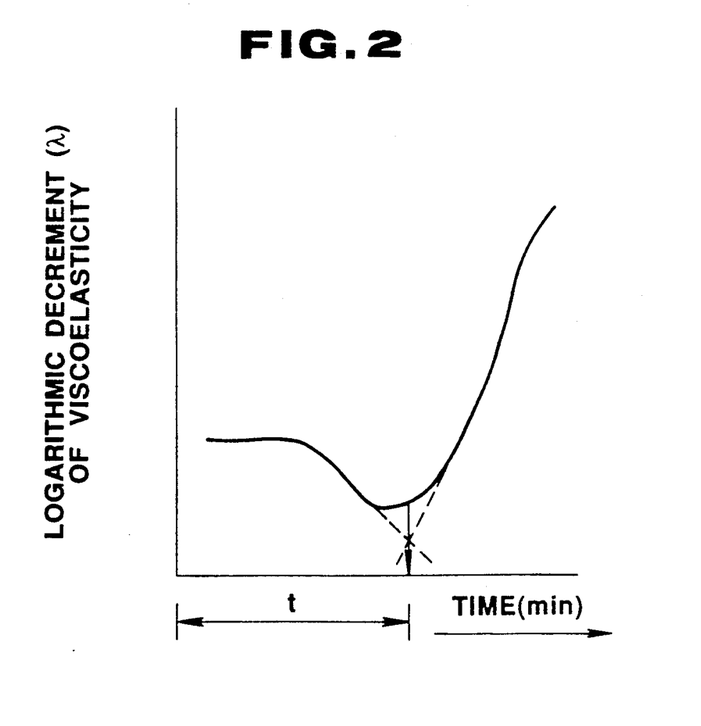
FIG. 2 is a graph showing the relationship between time and logarithmic decrement, for the purpose of determining the hardening starting time (t) of the second or intermediate paint film of the composite paint film coating according to the present invention.

The viscoelasticity of the intermediate coat paint was measured according to Oscillated Pendulum Analysis (OPA) or by the oscillated pendulum type viscoelasticity measuring device (the trade name "Rheo-Vibron DDV-OPA") produced by Orientic Corporation in Japan, under conditions of weight: 22 g, moment of inertia: 859 g.cm$^2$, and heating schedule: heating at 40° C. for 5 minutes→temperature rising at a rate of 10° C./min and for 10 minutes→maintaining the temperature at 140° C. In the course of this viscoelasticity measurement, a time duration (t) between a time point of starting heating and a time point of starting in rise of a logarithmic decrement of viscoelasticity as shown in FIG. 2 was determined to obtain the hardening starting time (t). FIG. 2 illustrates a method for determining the hardening starting time (t) for the intermediate coat paint.

EXPERIMENT

In order to evaluate the composite paint film coating of the present invention, the following discussion concerns a variety of experiments concerning production of the electrodeposition paint and the intermediate coat paint and Examples and Comparative Examples of the composite paint film coating obtained by combining the paints described above.

Production of Electrodeposition Paint

Production 1

Cationic thermosetting resin (1)

618 parts by weight of ethyleneglycol monobutylether, 475 parts by weight of bis-A type epoxy resin having an epoxy equivalent of 475 and 185 parts by weight of bis-A type epoxy resin having an epoxy equivalent of 185 were supplied into a clean reactor vessel equipped with a thermometer, a reflux condenser and a stirrer. The content of the reactor vessel was heated at 110° C. under stirring to completely dissolve the epoxy resins and then cooled to 60° C. thereby obtaining an epoxy resin solution.

Into a separate reactor vessel, 116 parts by weight of hexamethylene diamine and 500 parts by weight of Cardura E-10 (the trade name of Shell Kagaku Kabushiki Kaisha in Japan) were supplied. The content of the reactor vessel was heated at 120° C. under stirring for 3 hours thereby to obtain a diamine compound.

308 parts by weight of the diamine compound was gradually added into the above-mentioned epoxy resin solution under good stirring. This mixture was heated at 80° C. for 3 hours to make a reaction between the diamine compound and the epoxy resin. Subsequently, to this mixture, 53 parts by weight of diethanol amine and 36.5 parts by weight of diethyl amine were added, upon which reaction was made at 80° C .for 2 hours. Thereafter 386 parts by weight of Adeka Hardener EH-117-20 (the trade name of Asahi Denka Kogyo Kabushiki Kaisha in Japan) was added into the mixture, upon which the mixture was homogenously mixed at 90° C. Then 27.6 parts by weight of 88% formic acid was added to the mixture to neutralize it. Next, 2060 parts by weight of deionized water was gradually added to the mixture so that the mixture was emulsified and dispersed, thereby obtaining a water dispersion liquid of the the cationic thermosetting resin having a solid content concentration of 35%.

Production 2

Preparation of Pigment dispersing resin 714 parts by weight of methylisobutyl ketone (MIBK), 950 parts by weight of bis-A type epoxy resin having an epoxy equivalent of 475 and 1264 parts by weight of polypropylene diglycidyl ether-type epoxy resin were supplied into a clean reactor vessel equipped with a thermometer, a reflux concenser, a vacuum distillation device and a stirrer. The mixture in the reactor vessel was heated at 60° C. under sterring to be homogeneously dissovled thereby obtaining an epoxy resin solution.

Into a separate reactor vessel, 248 parts by weight of MIBK, 113 parts by weight of $\epsilon$-caprolactam and 348 parts by weight of toluylene diisocyanate were supplied. The mixture in the separate reactor vessel was heated and kept at 50° C. while stirring. After a lapse of 1 hour, a NCO value of the mixture was measured. When the NCO value had reached 27 to 29% in solid content, the mixture was cooled to 30° C., upon which 118 parts by weight of ethyleneglycol monobutylether was dropped to the mixture. Then, the mixture was kept at 40° C. thereby obtaining a reaction product having a NCO value of 18 to 19%.

620 parts by weight of this reaction product was gradually added into the above-mentioned epoxy resin solution under good stirring. This mixture was kept at 80° C. for 2 hours. Subsequently, 210 parts by weight of diethanol amine, 610 parts by weight of the diamine compound of Production 1 and 130 parts by weight of diethyl aminopropyl amine were added into the mixture and kept at 80° C. for 3 hours. Thereafter, 810 parts by weight of MIBK were removed under a vacuum distillation at a vacuum (within the reactor vessel) higher than 50 mmHg, upon which 810 parts by weight of ethyleneglycol monoethyl ether were added to the mixture in the reactor vessel, thereby obtaining a pigment dispersing resin for the purpose of dispersing pigment.

Preparation of pigment dispersed liquid

| Raw materials | |
|---|---|
| The above pigment dispersing resin | 12.5 (parts by weight) |
| 90% acetic acid | 6.7 |
| Deionized water | 26.3 |
| Carbon black | 0.5 |
| Titanium oxide | 20.0 |
| Kaolin | 5.0 |
| Basic lead silicate | 2.0 |
| Dibutyltinoxide | 1.0 |

Preparation

The pigment dispersing resin was supplied into a premixing tank equipped with a stirrer, and neutralized with acetic acid and diluted with deionized water. Subsequently, the carbon black, the titanium oxide, the kaokin, the basic lead silicate and the dibutyl tinoxide were supplied in the above-mentioned amounts into the premixing tank. The mixture in the premixing tank was vigorously stirred and previously dispersed. Thereafter, sufficient dispersion was made by a neograin mill dispersion machine, thereby obtaining a pigment dispersed liquid having a solid content of 52%.

Production 3

Active hydrogen-containing compound (2)-(A)

950 parts by weight of bisphenol A type epoxy resin having an epoxy equivalent of 475 and 588 parts by weight of propyleneglycol methylether were supplied into a clean 3 liter four-necked flask equipped with a thermometer, a reflux condenser and a stirrer, and heated to 110° C. while stirring so that the epoxy resins were dissolved thereby obtaining an epoxy resin solution. The epoxy resin solution was then cooled to 80° C., to which 422 parts by weight of a diketimine compound was added and kept at 80° C. for 2 hours. Thereafter, 12 parts by weight of acetic acid and 180 parts by weight of deionized water were added to the epoxy resin solution, upon which the reaction was made at 80° C. for 1 hour thereby obtaining a compound containing four active hydrogens per a molecule and having a solid content of 70%.

Note that the diketimine was obtained by dehydration polymerization (under heating) between 2 mols of methylethyl ketone and 1 mol of diethylene triamine.

Production 4

Active double bond-containing compound (2)-(B)

1000 parts by weight of an epoxidated polybutadiene having an oxyrane oxygen content of 6.5% and a number average molecular weight of 1800, 377 parts by weight of ethyleneglycol monobutyl ether and 131 parts by weight of methylethanol amine were supplied into a reactor vessel as same as that in Production 1 and kept at 170° C. for 6 hours in the stream of $N_2$ gas under stirring. Consequently, the mixture in the reactor vessel was cooled to 120° C., to which 81.4 parts by weight of acrylic acid, 8.8 parts by weight of hydroquinone and 27.1 parts by weight of ethyleneglycol monoethyl ether were added. Then, the mixture was kept at 120° C. for 4 hours thereby obtaining an active double bond-containing compound which a solid content of 75% and has two active double bonds per molecule.

Production 5

Already cross-linked particulate resin (2)

1064 parts by weight of the active double bond-containing compound of Production 4 as a multi-functional active double bond-containing compound, 300 parts by weight of Adeka Hardener EH-266 (the trade name of Asahi Denka Kogyo Kabushiki Kaisha in Japan; a modified aliphatic polyamine) as another multi-functional active double bond-containing compound and 325 parts by weight of isopropanol amine were supplied into a reactor vessel. The mixture in the reactor vessel was kept at 60° C. for 30 minutes thereby obtaining a reaction product.

In a separate cylindrical vessel, an aqueous solution containing 2500 parts by weight of deionized water and 17 parts by weight of 90% acetic acid had been provided. 621 parts by weight of the above reaction product was gradually added to the aqueous solution under vigorous stirring and kept at 60° C. for 3 hours thereby obtaining an aqueous dispersion liquid of an already cross-linked particulate resin which had a solid content of 20%, a cationic amine value of 1.7 milliequivalent/g in solid content, an average particle size of 0.1 u and a gelation degree of 95%.

Note that the average particle size was measured by a laser particle analyzer system "LPA-3000" which was produced by Otsuka Electronics Co., Ltd. in Japan.

The geleration degree is a weight percentage of a content which is unsoluble in tetrahydrofuran, relative to the whole solid content in the aqueous dispersion liquid. The unsoluble content in tegrahydrofuran was determined by sufficiently mixing 100 parts by weight of the aqueous dispersion liquid and 200 parts by weight of tetrahydrofuran and thereafter by settling unsoluble substance under centrifugal separation, the unsoluble substance being weighed as the unsoluble content.

Production 6

Already cross-linked particulate resin (2)

1428 parts by weight of the active hydrogen-containing compound of Production 3, 666 parts by weight of the active double bond-containing compound of Production 4 and 406 parts by weight of ethyleneglycol monobutyl ether were supplied into a reactor vessel. The mixture in the reactor vessel was kept at 50° C. for 1 hours under stirring. Then, 15.7 parts by weight of 88% formic acid was added to the mixture, and thereafter 7551 parts by weight of deionized water at 60° C. were gradually introduced into the mixture. Subsequently, the mixture was kept at 60° C. for 3 hours thereby obtaining an aqueous dispersion liquid of an already cross-linked particulate resin, having a solid content of 20%, a cationic amine value of 2.9 milliequivalent/g in solid content, an average particle size of 0.3 $\mu$, and a gelation degree of 88%.

Production of Cationic Electrodeposition Paint

Productions 7 to 15

Cationic electrodeposition paints of Productions 7 to 15 were prepared by blending the components in ratios (part by weight) shown in Table 1.

TABLE 1

| | | Production No. | | | | | | | | |
|---|---|---|---|---|---|---|---|---|---|---|
| | | 7 | 8 | 9 | 10 | 11 | 12 | 13 | 14 | 15 |
| Cationic thermosetting resin (Production 1) | | 1285 | 1285 | 1285 | 1285 | 1285 | 1285 | 1285 | 1285 | 1285 |
| Pigment dispersed liquid (Production 2) | | 370 | 370 | 370 | 370 | 370 | 370 | 370 | 370 | 370 |
| Deionized water | | 1558 | 1558 | 1558 | 1558 | 1558 | 1558 | 1558 | 1558 | 1558 |
| Already cross-linked particulate resin | Production 5 | 75 | 200 | 250 | 125 | — | — | — | 500 | 25 |
| | Production 6 | — | — | — | 125 | 250 | 375 | — | — | — |

Production of Intermediate Coat Paint

Production 16

(A) Polyester resin varnish

Components shown in Table 2A were supplied in blended ratios shown in Table 2A into a reactor vessel equipped with a stirrer, a thermometer, a reflux condenser attached with a pipe for removing water of reaction, and a nitrogen gas introduction pipe. The components were mixed with each other in the reactor vessel.

The resultant mixture in the reactor vessel was heated to 120° C. to be dissolved, and thereafter the temperature of the mixture was raised to 160° C. while stirring. After the temperature of the mixture was gradually raised to 230° C. during lapse of 3 hours (i.e., temperature raising rate: 70° C./3 hrs.). Then reaction of the mixture was continued upon keeping the temperature at 230° C., in which the acid value of the mixture was being measured after the temperature had reached 230° C. When the acid value had reached 5, the reaction of the mixture was terminated and then the mixture was cooled. The amount of water of reaction was 12 parts by weight. After cooling, a solvent having the following composition was supplied into the reactor vessel to dilute the reaction mixture within the reactor vessel thereby to obtain a polyester resin varnish:

| | |
|---|---|
| Xylene | 17.6 (parts by weight) |
| SOLVESSO 150 | 17.6 |
| Ethyleneglycol-monoethylether | 11.7 |
| Cyclohexanone | 11.7 | that SOLVESSO ISO is a trade name of Exxon Chemical Co., Ltd.

The resultant polyester resin varnish had a non-volatile content of 60% and a viscosity of L to M, measured by a Gardner-Holdt bubble viscometer. The physical properties of the resultant polyester is shown in Table 2B.

TABLE 2A

| Component | Part by weight |
|---|---|
| Cyclohexane-1,4-dimethylol | 10.0 |
| Neopentylglycol | 27.9 |
| Trimethylolpropane | 5.8 |
| Adipic acid | 6.3 |
| Isophthalic acid | 50.0 |

TABLE 2B

| Item | Value |
|---|---|
| Dehydration amount (ml) | 12 |
| Designed acid value | 5 |
| Designed hydroxyl value | 78.6 |
| Designed number average molecular weight | 2000 |
| Average number of hydroxyl groups in a molecule | 2.8 |
| Viscosity in 60% concentration (according to Gardner-Holdt bubble viscometer) | L-M |

Production 17

(B) Paint preparation

An intermediate coat paint was prepared with the following blending ratio of components and according to the following manner:

| | |
|---|---|
| The polyester resin vanish of Production 16 | 48.5 (Part by weight) |
| UBAN 21R | 24.9 |
| Rutile titanium oxide | 31.6 |
| Mapico yellow | 1.2 |
| Carbon black | 0.4 |

Note that UBAN 21R is a trade name of Mitsui Toatsu Chemical Inc. in Japan and is a melamine resin varnish having a solid content of 50%.

The polyester resin varnish, rutile titanium oxide, Mapico yellow and carbon black were supplied into the vessel of a ball mill dispersion machine and mixed with each other for 48 hours under action of ceramic balls so as to disperse the solid contents. After dispersion, the ceramic balls were filtered out by using a sieve. Then, UBAN 21R was added to the dispersion mixture and mixed by a dissolver thus preparing an intermediate coat paint.

Productions 18 to 21

Intermediate coat paints of Productions 18 to 21 were prepared according to the method in Production 17 and with component blended ratios (part by weight) shown in Table 3. The hardening starting times of these intermediate coat paints were measured and shown in Table 3.

TABLE 3

| | Production 17 | Production 18 | Production 19 | Production 20 | Production 21 |
|---|---|---|---|---|---|
| Polyester resin varnish (solid content: 60%) | 48.5 | 48.5 | 48.5 | 48.5 | 48.5 |
| UBAN 21R (solid content: 50%)[1] | 24.9 | — | — | — | — |

TABLE 3-continued

|  | Production 17 | Production 18 | Production 19 | Production 20 | Production 21 |
|---|---|---|---|---|---|
| UBAN 20SE-60 (solid content: 60%)[2] | — | 20.8 | — | — | — |
| UBAN 28 (solid content: 60%)[3] | — | — | 20.8 | — | — |
| UBAN 225 (solid content: 60%)[4] | — | — | — | 20.8 | — |
| CYMEL 325 (solid content: 80%)[5] | — | — | — | — | 15.6 |
| Rutile titanium oxide | 31.6 | 31.6 | 31.6 | 31.6 | 31.6 |
| Mapico yellow | 1.2 | 1.2 | 1.2 | 1.2 | 1.2 |
| Carbon black | 0.4 | 0.4 | 0.3 | 0.4 | 0.4 |
| Polyester resin/melamine resin | 70/30 | 70/30 | 70/30 | 70/30 | 70/30 |
| Hardening starting time (min.) | 11 | 14 | 15 | 17 | 19 |

Note: Chemicals [1] to [5] are melamine resin varnishes produced by Mitsui Toatsu Chemical Inc.

Preparation of Plate Coated with Electrodeposition Paint

An electrodeposition painting with the electrodeposition paints of Productions 7 to 15 was carried out onto an automotive steel sheet treated with zinc phosphate, under such conditions that the average film thickness of the coated electrodeposition film after baking became 20 microns. The baking was taken place at 175° C. for 30 minutes. Thus, nine kinds of plates coated with different electrodeposition paints were prepared.

The automotive steel sheet was used as a cathode in the electrodeposition painting and produced by Nippon test Panel Industry Co., Ltd. in Japan. The automotive steel sheet had an average surface roughness of 0.9 micron.

Painting Method of Intermediate and Finish Coat Paints

The above-mentioned intermediate paints of Production Nos. 17 to 21 were coated on the above nine kinds of electrodeposition paint coated-steel sheet by spray-painting to have a coat film thickness of 30 to 40 μm. After allowing to stand for a predetermined time, baking was made at 140° C. for 30 minutes. Subsequently, the respective steel plates coated with the intermediate paints were further coated wth an alkyd resin finish coat paint (Melami No. 1500 black: the trade name of Nihon Oil & Fats Co., Ltd.) to have a paint film thickness of 35 to 40 um. Then baking was made for each steel plate with the finish coat.

Examples 1 to 18 and Comparative Examples 1 to 15

Concerning a variety of painting systems as shown in Table 4, edge corrosion (rust) resistance and hardening characteristics of the coated electrodeposition paint and finish condition of the finish coat paint were evaluated. The painting systems of Comparative Examples 1 to 15 are not within the scope of the present invention, while the painting systems of Examples 1 to 18 are within the scope of the present invention.

In Table 4, "Flow intermediate coat" means an intermediate coat using an intermediate coat paint which has a good flowability during hardening under baking.

The edge corrosion resistance in Table 4 was measured by the following method: A steel cutter knife blade (LB-10: trade name of OLFA Corporation in Japan) was chemically treated with PBL3020 (the trade name of Nihon Parkerizing Co., Ltd in Japan). Each of the above-mentioned nine kinds of electrodeposition paints was coated on the chemically treated knife blake and thereafter coated with the electrodeposition paint. Then, the coated electrodeposition paint was baked at 175° C. for 30 minutes. Thereafter the knife blades coated with the electrodeposition paints were subjected to a salt water spraying test of 168 hours. After the test, the number of rusted points at the edge section was counted as shown in Table 4.

TABLE 4

|  |  | Comparative Example | | | | | | |
|---|---|---|---|---|---|---|---|---|
|  |  | 1 | 2 | 3 | 4 | 5 | 6 | 7 |
| Cationic electrodeposition paint | | | | | | | | |
| Production No. | | 13 | 14 | 13 | 14 | 13 | 14 | 13 |
| Blended amount (part by wt.) | | | | | | | | |
| (1) Cationic thermosetting resin (Production 1) | | 1285 | 1285 | 1285 | 1285 | 1285 | 1285 | 1285 |
| Pigment dispersed liquid (Production 2) | | 370 | 370 | 370 | 370 | 370 | 370 | 370 |
| Deionized water | | 1558 | 1558 | 1558 | 1558 | 1558 | 1558 | 1558 |
| (2) Already cross-linked particulate resin | | | | | | | | |
| Production 5 | | — | — | — | — | — | — | — |
| Production 6 | | — | — | — | — | — | — | — |
| (2)/(1) (Resin weight ratio in solid content) | | 0 | 0.20 | 0 | 0.20 | 0 | 0.20 | 0 |
| Minimum melt viscosity (λ min) by OPA | | 0.15 | 0.52 | 0.15 | 0.52 | 0.15 | 0.52 | 0.15 |
| Hardening characteristics of intermediate coat paint (hardening starting time (min) by OPA) | Conventional intermediate coat (11 min) | Production 17 | Production 17 | — | — | — | — | — |
| | Flow intermediate coat (14 min) | — | — | Production 18 | Production 18 | — | — | — |
| | Flow intermediate coat (15 min) | — | — | — | — | Production 19 | Production 19 | — |
| | Flow intermediate coat (17 min) | — | — | — | — | — | — | Production 20 |
| | Flow intermediate | — | — | — | — | — | — | — |

TABLE 4-continued

| | | | | | | | | |
|---|---|---|---|---|---|---|---|---|
| | coat (19 min) | | | | | | | |
| Edge corrosion resistance (number of rusted points) 168 hr | | 100< | 0 | 100< | 0 | 100< | 0 | 100< |
| PGD value after coating of finish coat paint | On horizontal plane | 1.0 | 0.7 | 1.0 | 0.8 | 1.0 | 0.8 | 1.0 |
| | On vertical plane | 0.5 | 0.5 | 0.5 | 0.5 | 0.5 | 0.5 | 0.5 |

| | | Comparative Example | | | | | | | |
|---|---|---|---|---|---|---|---|---|---|
| | | 8 | 9 | 10 | 11 | 12 | 13 | 14 | 15 |
| Cationic electrodeposition paint | | | | | | | | | |
| Production No. | | 14 | 13 | 14 | 15 | 15 | 15 | 15 | 15 |
| Blended amount (part by wt.) | | | | | | | | | |
| (1) Cationic thermosetting resin (Production 1) | | 1285 | 1285 | 1285 | 1285 | 1285 | 1285 | 1285 | 1285 |
| Pigment dispersed liquid (Production 2) | | 370 | 370 | 370 | 370 | 370 | 370 | 370 | 370 |
| Deionized water | | 1558 | 1558 | 1558 | 1558 | 1558 | 1558 | 1558 | 1558 |
| (2) Already cross-linked particulate resin | | | | | | | | | |
| Production 5 | | — | — | — | 25 | 25 | 25 | 25 | 25 |
| Production 6 | | — | — | — | 0 | 0 | 0 | 0 | 0 |
| (2)/(1) (Resin weight ratio in solid content) | | 0.20 | 0 | 0.20 | 0.01 | 0.01 | 0.01 | 0.01 | 0.01 |
| Minimum melt viscosity ($\lambda$ min) by OPA | | 0.52 | 0.15 | 0.52 | 0.17 | 0.17 | 0.17 | 0.17 | 0.17 |
| Hardening characteristics of intermediate coat paint (hardening starting time (min) by OPA) | Conventional intermediate coat (11 min) | — | — | — | Production 17 | — | — | — | — |
| | Flow intermediate coat (14 min) | — | — | — | — | Production 18 | — | — | — |
| | Flow intermediate coat (15 min) | — | — | — | — | — | Production 19 | — | — |
| | Flow intermediate coat (17 min) | Production 20 | — | — | — | — | — | Production 20 | — |
| | Flow intermediate coat (19 min) | — | Production 21 | Production 21 | — | — | — | — | Production 21 |
| Edge corrosion resistance (number of rusted points) 168 hr | | 0 | 100< | 0 | 50–60 | 50–60 | 50–60 | 50–60 | 50–60 |
| PGD value after coating of finish coat paint | On horizontal plane | 0.9 | 1.0 | 0.9 | 0.90 | 0.95 | 1.0 | 1.0 | 1.0 |
| | On vertical plane | 0.5 | 0.5 | 0.5 | 0.5 | 0.5 | 0.5 | 0.5 | 0.5 |

| | | Example | | | | | | |
|---|---|---|---|---|---|---|---|---|
| | | 1 | 2 | 3 | 4 | 5 | 6 | 7 |
| Cationic electrodeposition paint | | | | | | | | |
| Production No. | | | 7 | | | 8 | | 9 |
| Blended amount (part by wt.) | | | | | | | | |
| (1) Cationic thermosetting resin (Production 1) | | 1285 | 1285 | 1285 | 1285 | 1285 | 1285 | 1285 |
| Pigment dispersed liquid (Production 2) | | 370 | 370 | 370 | 370 | 370 | 370 | 370 |
| Deionized water | | 1558 | 1558 | 1558 | 1558 | 1558 | 1558 | 1558 |
| (2) Already cross-linked particulate resin | | | | | | | | |
| Production 5 | | 75 | 75 | 75 | 200 | 200 | 200 | 250 |
| Production 6 | | — | — | — | — | — | — | — |
| (2)/(1) (Resin weight ratio in solid content) | | 0.03 | 0.03 | 0.03 | 0.08 | 0.08 | 0.08 | 0.10 |
| Minimum melt viscosity ($\lambda$ min) by OPA | | 0.21 | 0.21 | 0.21 | 0.28 | 0.28 | 0.28 | 0.31 |
| Hardening characteristics of intermediate coat paint (hardening starting time (min) by OPA) | Flow intermediate coat (15 min) | Production 19 | — | — | Production 19 | — | — | Production 19 |
| | Flow intermediate coat (17 min) | — | Production 20 | — | — | Production 20 | — | — |
| | Flow intermediate coat (19 min) | — | — | Production 21 | — | — | Production 21 | — |
| Edge corrosion resistance (number of rusted points) 168 hr | | 7.8 | 7.8 | 7.8 | 4.2 | 4.2 | 4.2 | 0.2 |
| PGD value after coating of finish coat paint | On horizontal plane | 1.0 | 1.0 | 1.0 | 1.0 | 1.0 | 1.0 | 1.0 |
| | On vertical plane | 0.5 | 0.5 | 1.0 | 0.5 | 0.5 | 0.5 | 0.5 |

| | | Example | | | | | | |
|---|---|---|---|---|---|---|---|---|
| | | 8 | 9 | 10 | 11 | 12 | 13 | 14 |
| Cationic electrodeposition paint | | | | | | | | |
| Production No. | | | 9 | | | 10 | | 11 |

TABLE 4-continued

| Blended amount (part by wt.) | | | | | | | | |
|---|---|---|---|---|---|---|---|---|
| (1) Cationic thermosetting resin (Production 1) | | 1285 | 1285 | 1285 | 1285 | 1285 | 1285 | 1285 |
| Pigment dispersed liquid (Production 2) | | 370 | 370 | 370 | 370 | 370 | 370 | 370 |
| Deionized water | | 1558 | 1558 | 1558 | 1558 | 1558 | 1558 | 1558 |
| (2) Already cross-linked particulate resin | | | | | | | | |
| Production 5 | | 250 | 250 | 125 | 125 | 125 | — | — |
| Production 6 | | — | — | 125 | 125 | 125 | 250 | 250 |
| (2)/(1) (Resin weight ratio in solid content) | | 0.10 | 0.10 | 0.10 | 0.10 | 0.10 | 0.10 | 0.10 |
| Minimum melt viscosity (λ min) by OPA | | 0.31 | 0.31 | 0.32 | 0.32 | 0.32 | 0.32 | 0.322 |
| Hardening characteristics of intermediate coat paint (hardening starting time (min) by OPA) | Flow intermediate coat (15 min) | — | — | Production 19 | — | — | Production 19 | — |
| | Flow intermediate coat (17 min) | Production 20 | — | — | Production 20 | — | — | Production 20 |
| | Flow intermediate coat (19 min) | — | Production 21 | — | — | Production 21 | — | — |
| Edge corrosion resistance (number of rusted points) 168 hr | | 0.2 | 0.2 | 0 | — | 0 | 0 | 0 |
| PGD value after coating of finish coat paint | On horizontal plane | 1.0 | 1.0 | 1.0 | 1.0 | 1.0 | 1.0 | 1.0 |
| | On vertical plane | 0.5 | 0.5 | 0.5 | 0.5 | 0.5 | 0.5 | 0.5 |

| | | Example | | | |
|---|---|---|---|---|---|
| | | 15 | 16 | 17 | 18 |
| Cationic electrodeposition paint | | | | | |
| Production No. | | 11 | | 12 | |
| Blended amount (part by wt.) | | | | | |
| (1) Cationic thermosetting resin (Production 1) | | 1285 | 1285 | 1285 | 1285 |
| Pigment dispersed liquid (Production 2) | | 370 | 370 | 370 | 370 |
| Deionized water | | 1558 | 1558 | 1558 | 1558 |
| (2) Already cross-linked particulate resin | | | | | |
| Production 5 | | — | — | — | — |
| Production 6 | | 250 | 375 | 375 | 375 |
| (2)/(1) (Resin weight ratio in solid content) | | 0.10 | 0.15 | 0.15 | 0.15 |
| Minimum melt viscosity (λ min) by OPA | | 0.32 | 0.41 | 0.41 | 0.41 |
| Hardening characteristics of intermediate coat paint (hardening starting time (min) by OPA) | Flow intermediate coat (15 min) | — | Production 19 | — | — |
| | Flow intermediate coat (17 min) | — | — | Production 20 | — |
| | Flow intermediate coat (19 min) | Production 21 | — | — | Production 21 |
| Edge corrosion resistance (number of rusted points) 168 hr | | 0 | 0 | 0 | 0 |
| PGD value after coating of finish coat paint | On horizontal plane | 1.0 | 1.0 | 1.0 | 1.0 |
| | On vertical plane | 0.5 | 0.5 | 0.5 | 0.5 |

What is claimed is:

1. A composite paint film coating comprising:
a first paint film (I) formed of cationic electrodeposition paint composition and having a minimum melt viscosity not less than 0.2 during hardening, said minimum melt viscosity being determined according to a logarithmic decrement of viscoelasticity of said first paint film and by an oscillated pendulum type viscoelasticity measuring device, said cathodic electrodeposition paint composition consisting essentially of:
a cationic thermosetting resin (1), and
an already cross-linked particulate resin (2) which is an addition-polymer formed between a first compound (A) having at least two primary amino groups per molecule and a second compound (B) having at least two α,β-ethylenic unsaturated groups, said first compound (A) being a resin produced by hydrolysis of an addition reaction product between a ketimine compound and an epoxy resin, said second compound (B) being produced by reaction between an epoxidated polybutadiene having at least two epoxy groups per molecule and a carboxylic acid having at least two α,β-ethylenic unsaturated groups per molecule, said addition-polymer having a cationic group, said particulate resin having an average particle size ranging from 0.01 to 1 μm, a weight ratio ((2)/(1)) in solid content between said particulate resin (2) and said cationic thermosetting resin (1) being within a range from 0.03 to 0.15; and a second paint film (II) coated on said first paint film and including at least polyester resin vanish, said second paint film having a hardening starting time ranging from 15 to 20 minutes, said hardening starting time being determined according to a logarithmic decrement of viscoelasticity of said second film and by said oscillated pendulum type viscoelasticity measuring device.

2. A composite paint film coating as claimed in claim 1, wherein said epoxidated polybutadiene has a molecular weight ranging from 500 to 10000, an iodine value ranging from 50 to 500 and an oxyrane oxygen ranging from 3 to 12% by weight.

3. A composite paint film coating as claimed in claim 1, wherein said cationic thermosetting resin is selected from the group consisting of a resin containing amino group, a resin containing sulfonium group, and a resin containing phosphonium group.

4. A composite paint film coating as claimed in claim 3, wherein said resin containing amino group is selected from the group consisting of amine-modified epoxy resin, amine-modified polyurethane polyol resin, and amine-modified polybutadiene resin.

5. A composite paint film coating as claimed in claim 1, wherein said ketimine compound is produced by dehydration condensation reaction between an amine compound having at least one secondary amine and at least one primary amine in a molecule, and ketone compound.

6. A composite paint film coating as claimed in claim 5, wherein said ketone compound is selected from the group consisting of acetone, methylethyl ketone, methylisobutyl ketone, methylpropyl ketone and cyclohexane.

7. A composite paint film coating as claimed in claim 5, wherein said amine compound is selected from the group consisting of a monoalkyl aminoalkyl amine and a polyalkylene polyamine.

8. A composite paint film coating as claimed in claim 7, wherein said monoalkyl aminoalkyl amine is selected from group consisting of monomethyl aminoethyl amine, monoethyl aminoethyl amine, monomethyl aminopropyl amine, and monoethyl aminopropyl amine.

9. A composite paint film coating as claimed in claim 7, wherein said polyalkylene polyamine is selected from the group consisting of diethylene triamine, dibutylene triamine and triethylene tetramine.

10. An outer panel of an automotive vehicle body, comprising:
a steel sheet forming part of the automotive vehicle body;
a first paint film (I) coated on the surface of said steel sheet, said first paint film being formed of cationic electrodeposition paint composition and having a minimum melt viscosity not less than 0.2 during hardening, said melt viscosity being determined according to a logarithmic decrement of viscoelasticity of said first paint film and by an oscillated pendulum type viscoelasticity measuring device, said cathodic electrodeposition paint composition consisting essentially of:
a cationic thermosetting resin (1);
an already cross-linked particulate resin (2) which is an addition-polymer formed between a first compound (A) having at least two primary amino groups in a molecule and a second compound (B) having at least two $\alpha,\beta$-ethylenic unsaturated groups, said first compound being (A) a resin produced by hydrolysis of an addition reaction product between a ketimine compound and an epoxy resin, said second compound (B) being produced by reaction between an epoxidated polybutadiene having at least two epoxy groups per molecule and a carboxylic acid having at least two $\alpha,\beta$-ethylenic unsaturated groups per molecule, said addition-polymer having a cationic group, said particular resin having an average particle size ranging from 0.1 to 1 $\mu$m, a weight ratio ((2)/(1)) in solid content between said particulate resin (2) and said cationic thermosetting resin (1) being within a range from 0.03 to 0.15; and
a second paint film (II) coated on said first paint film and including at least polyester resin vanish, said second paint film having a hardening starting time ranging from 15 to 20 minutes, said hardening starting time being determined according to a logarithmic decrement of viscoelasticity of said second film and by said oscillated pendulum type viscoelasticity measuring device.

* * * * *